US006219742B1

(12) United States Patent
Stanley

(10) Patent No.: US 6,219,742 B1
(45) Date of Patent: *Apr. 17, 2001

(54) METHOD AND APPARATUS FOR ARTIFICIALLY GENERATING GENERAL PURPOSE EVENTS IN AN ACPI ENVIRONMENT

(75) Inventor: Paul C. Stanley, The Woodlands, TX (US)

(73) Assignee: Compaq Computer Corporation, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/069,271

(22) Filed: Apr. 29, 1998

(51) Int. Cl.[7] .................................................. G06F 13/24
(52) U.S. Cl. ............................................ 710/260; 710/100
(58) Field of Search ............................... 710/11, 16, 62, 710/72, 101, 105, 104, 260; 713/129, 1, 100

(56) References Cited

U.S. PATENT DOCUMENTS

| 5,754,869 | * | 5/1998 | Holzhammer et al. | 713/300 |
| 5,796,974 | * | 8/1998 | Goddard et al. | 712/211 |
| 5,919,264 | * | 7/1999 | Reneris | 713/324 |
| 5,926,435 | * | 7/1999 | Park et al. | 365/233 |
| 5,937,200 | * | 8/1999 | Frid et al. | 710/264 |
| 5,944,831 | * | 8/1999 | Pate et al. | 713/324 |
| 5,978,952 | * | 11/1999 | Hayek et al. | 714/764 |

OTHER PUBLICATIONS

Intel/Microsoft/Toshiba, *Advanced Configuration and Power Interface Specification*, Rev. 1.0, Dec. 22, 1996, Cover, ii–xiii, 4–34–4–72, 5–97–5–103.
Advanced Configuration and Power Interface Specification, Revision 1.0, Dec. 1996.*
Structured Computer Organization, Andrew S. Tanenbaum pp. 11–13, 1990.*

* cited by examiner

*Primary Examiner*—Paul R. Myers
(74) *Attorney, Agent, or Firm*—Akin, Gump, Strauss, Hauer & Feld, LLP

(57) ABSTRACT

A hardware implementation of the General Purpose Event status register supports the ability to assert, under software control, individual General Purpose Event status bits in a General Purpose Event register in an ACPI environment. Software control over the General Purpose Event register allows compensation of a platform electronic apparatus for design defects discovered late in the development cycle. Software control also enables the creation at any time of new "hardware events" which are then processed by the ACPI driver by means of manufacturer provided P-code. The ability to provide a software work-around for a wide range of ACPI related difficulties is advantageously created. Moreover, additional ACPI value-added features can thereafter be developed to differentiate and enhance ACPI compatible products.

32 Claims, 5 Drawing Sheets

| REGISTER | SIZE (BYTES) | ADDRESS (RELATIVE TO REGISTER BLOCK) |
|---|---|---|
| GPE0_STS | GPE0_LEN2 | < GPE0_BLK > |
| GPE0_EN | GPE0_LEN2 | < GPE0_BLK > + GPE0_LEN2 |
| GPE1_STS | GPE1_LEN2 | < GPE1_BLK > |
| GPE1_EN | GPE1_LEN2 | < GPE1_BLK > + GPE1_LEN2 |

METHOD AND APPARATUS FOR ARTIFICIALLY GENERATING GENERAL PURPOSE EVENTS IN AN ACPI ENVIRONMENT

BACKGROUND OF THE INVENTION

1. Field of the Invention

The present invention relates to the relationship between firmware and hardware in a computer system, and more specifically to software control of hardware.

2. Background of the Related Art

In 1996, Microsoft and other computer companies developed the Advanced Configuration and Power Interface (ACPI) paradigm. The ACPI has been intended to replace both the plug-and-play and the Advanced Power Management (APM), and virtually eliminate the need for a system Basic Input/Output System (BIOS) to configure the system. The ACPI operating system performs all of the functions previously performed by plug-and-play (PnP) and the Advanced Power Management (APM), reducing the system Basic Input Output System to a small collection of routines callable from the operating system.

Microsoft and other computer companies have determined to relegate to the operating system (OS) various functions that had previously been performed by the system Basic Input Output System. Traditionally when power has been applied to a computer system, a system Basic Input Output System, typically residing in ROM or PROM (and therefore difficult to modify) or in an Initial Program Load (IPL) device that cannot be disabled, executes immediately. The system Basic Input Output System includes firmware that configures the computer system, and provides a variety of other functions. In many systems, following the execution of the system Basic Input Output System, a Plug-and-Play Basic Input Output System and an Advanced Power Management Basic Input Output System execute, with related utilities. (The Plug-and-Play Basic Input Output System is not to be confused with the system Basic Input Output System.) The Plug-and-Play Basic Input Output System re-configures the system either dynamically or statically to allow the operating system to initialize. The Advanced Power Management controls system power, including sleep states and power states. ACPI replaces both the Plug-and-Play Basic Input Output System and Advanced Power Management Basic Input Output System, and other system initialization functionality, by providing operating systems and a platform/device interface that can perform these tasks in a more centralized paradigm. (The Advanced Power Management Basic Input Output System is not to be confused with either the system Basic Input Output System or the PnP Basic Input Output System.) However, to function properly, ACPI also requires compliance of platform hardware, imposing certain ACPI compatible hardware interface requirements on computer manufacturers, such that all devices will be compatible with the ACPI compatible operating systems. Thus, from the perspective of the manufacturer, the ACPI specification may be seen as a hardware interface specification.

The ACPI specification creates certain hardware components and extensions to facilitate the hardware interface. One of the additional hardware extensions necessary under the ACPI specification has been the general purpose event (OPE) status register. This register contains a set of event indicators, the occurrence of any of which causes a system control interrupt (SCI). The System Control Interrupt, visible to the operating system, operates within the operating system much as a System Management Interrupt (SMI) operates within a manufacturer-provided software package. ACPI operating systems use the System Control Interrupt handler to respond to events, while legacy systems use some type of transparent interrupt handler to respond to these events (that is, a System Management Interrupt handler).

The General Purpose Event status register includes a number of status bits, and each manufacturer has been expected to interconnect hardware signals such that the appropriate hardware events cause the assertion of the appropriate General Purpose Event status bit. Handling of the event has been relegated to the device driver or to manufacturer-provided p-code. One type of p-code, AML (ACPI Machine Language), is a virtual machine language, compiled from a pseudocode referred to as ASL (ACPI Source Language). This machine language is the p-code in which device control methods are written, and which is understandable to all ACPI-compatible operating systems. An ACPI operating system does not detect general purpose events other than through the General Purpose Event status register, and in the ACPI paradigm only the operating system can load and execute a device control method. Moreover, only the operating system can perform power functions, such as put the processor into a sleep state or perform a system wake-up. Thus, platform devices must provide the proper information to the General Purpose Event status register's status bit, at the proper time, to be detected by the operating system.

Unfortunately, while conforming hardware interface design to a single standard provides many of the benefits of standardization, it also imposes a burden on computer manufacturers. It can be extremely difficult for a hardware designer to develop a design architecture that is compatible with the General Purpose Event status register circuitry. Due to the complexity of the ACPI and platform control, some hardware designs may not be able to access the General Purpose Event status register and cause the system control interrupt when necessary. Many hardware designers may therefore be required to add external circuitry in order to connect their devices with the appropriate General Purpose Event status register bits.

From the perspective of ACPI, ACPI compatibility and compliance has been the responsibility of the device developer. Therefore, the manufacturer must interconnect hardware signals from devices to the General Purpose Event registers, such that all of the interconnections comply with ACPI. Therefore, if a manufacturer changes hardware design, the manufacturer must ensure that the new design also complies with the ACPI requirements relating to the General Purpose Event status registers. Where the interconnections do not comply, the manufacturer must provide additional external circuitry to force the signal from the devices to comply with the requirements of the General Purpose Event registers. Although this may not be a significant problem for the manufacturer if detected very early in the product development, once the designer has begun developing the circuitry to implement the product, changes necessary merely to interface with the general purpose event status register are increasingly expensive and difficult to implement.

SUMMARY OF THE INVENTION

Briefly, the present invention relates to a hardware implementation of the General Purpose Event status register which supports the ability to assert individual General Purpose Event status bits under software control. Since hardware changes are increasingly difficult as the product cycle wears on, a software assisted solution to this class of problems is very important to mitigating risk. Software control enables the creation at any time of new "hardware events" which are then processed by the ACPI driver by means of manufacturer-provided p-code, and thus the ability to provide a software work-around for a wide range of ACPI related difficulties is advantageously created. Moreover, additional ACPI value-added features can thereafter be developed to differentiate and enhance ACPI compatible products.

General purpose event registers, containing a number of bits physically implemented as pins on an electronic device, receive signals from other devices on the platform indicating the occurrence of an event at the device. The event may be an interrupt, a hardware event, or other type of event. Also, the general purpose event registers receive artificially-created signals generated in software running on a microprocessor on the platform. The software generating the artificially-created general purpose event signals compensates and extends the hardware associated with the general purpose event registers, and adds functionality. Development of new ACPI-compatible platforms is thus accelerated, since problems discovered during a development cycle may be corrected in software as well as in hardware, and since new features requiring a software component may also be developed.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE DRAWINGS

The present invention relates to detection of events occurring in an ACPI-compatible system operating with a number of external devices, coupled to the platform (whether on the systemboard or via a PCI or other bus connection) via a set of General Purpose Event register blocks. The ACPI, or the Advanced Control and Power Interface, is a new paradigm for interfacing hardware and software. In an ACPI environment, both hardware/software interfacing and power management are determined by the operating system, rather than by the system Basic Input Output System and by the Advanced Power Management. The ACPI is intended to define hardware and software interfaces flexibly and abstractly, to allow flexible hardware and operating system design and implementation, with a minimum of inflexible interface requirements.

Figure 1:
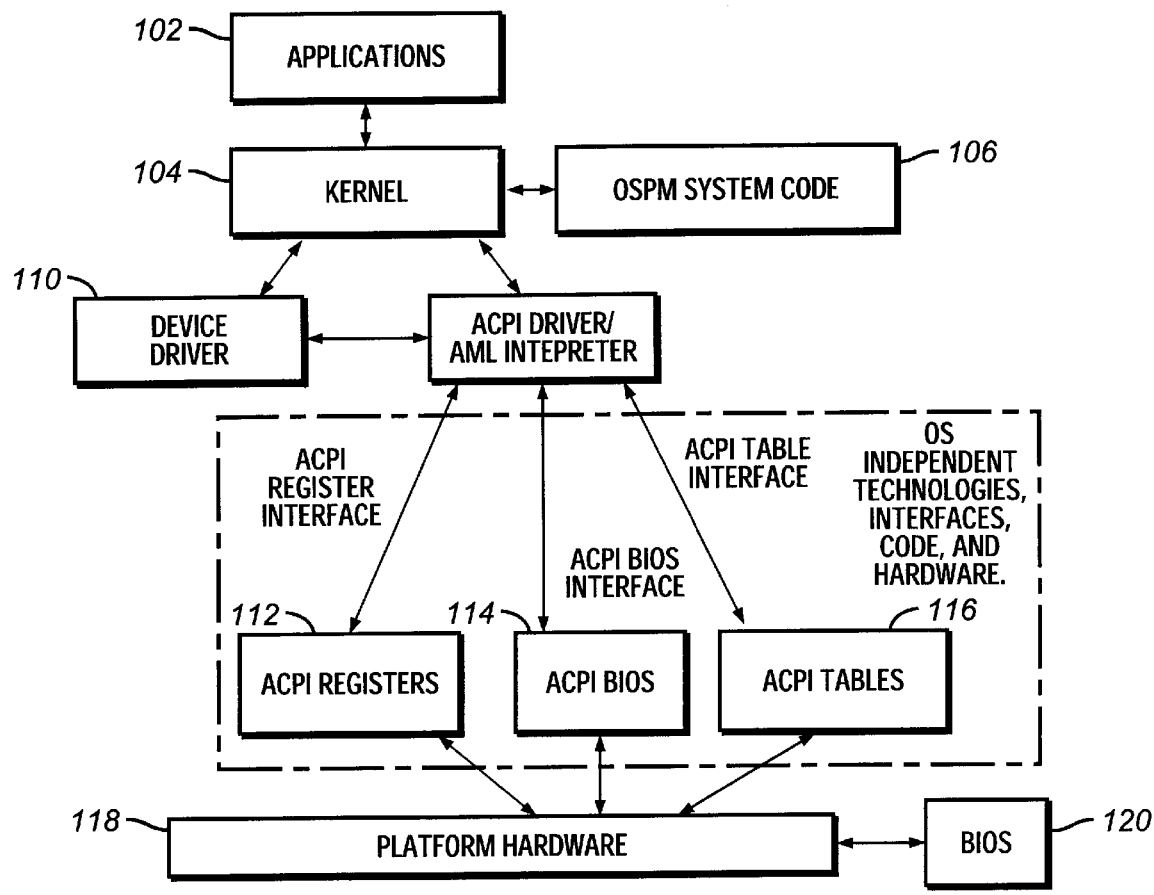
FIG. 1 is a schematic diagram of the prior art of the ACPI Global System, including the operating system directed power management (OSPM).

1. The ACPI Environment and ACPI-Compatible Systems: Operating System Compatible Systems: Operating System Control of Hardware Referring now to FIG. 1, the ACPI Global System, including the operating system directed power management (OSPM), is shown. Various operating system dependent software applications 102, running on a system interface, through a kernel 104 with the operating system directed power management system code 106, and with an ACPI driver/machine language interpreter 108. As indicated above, AML (ACPI Machine Language) is a virtual machine language, compiled from ASL (ACPI Source Language), in which device control methods are written, and which is understandable to all ACPI-compatible operating systems. Device control methods are typically written by device manufacturers and provided to platform developers and manufacturers. The operating system directed power management system code 106 and ACPI driver/machine language interpreter 108 operate in software within the microprocessor, and are operating system specific. The kernel 104 also interfaces with a device driver 110, also running in software on the microprocessor. Through the ACPI driver/machine language interpreter 108, software interfaces with the ACPI registers 112, the ACPI Basic Input Output System 120, and the ACPI tables 116, to the platform hardware 118 and, through the platform hardware 118, to the system Basic Input Output System 120. (The ACPI Basic Input Output System is not to be confused with the Basic Input Output System associated with the Advanced Power Management, PnP, or system BIOS.) The device driver 110 also allows interface with the platform hardware. The ACPI tables 116 describe the interface to the hardware. Although some controls are imbedded in fixed blocks of registers, the ACPI tables 116 specify the addresses of the register blocks. When the operating system executes p-code, the ACPI tables 116 can be accessed. ACPI machine language (AML) is a machine language capable of interfacing between any ACPI aware operating system and any system Basic Input Output System function. ACPI is intended to interface between hardware and software, though the requirements of the ACPI environment may be viewed in many respects as a hardware specification.

Figures 2, 3:
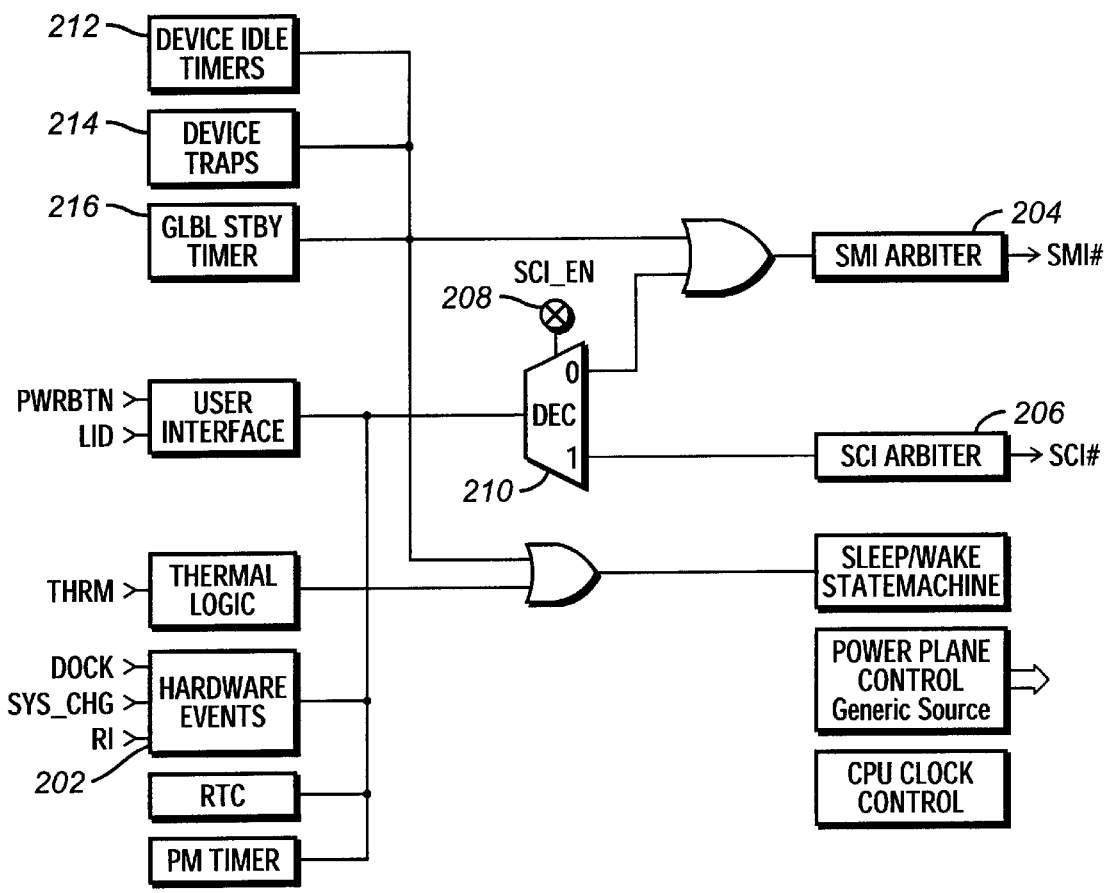
FIG. 2 is a schematic electrical circuit diagram of the prior art of a structure for a switchable legacy/ACPI compatible event model.
FIG. 3 is a schematic diagram of the prior art of a General Purpose Event register block, having status and enable registers each having a number of bits.
Figure 5:
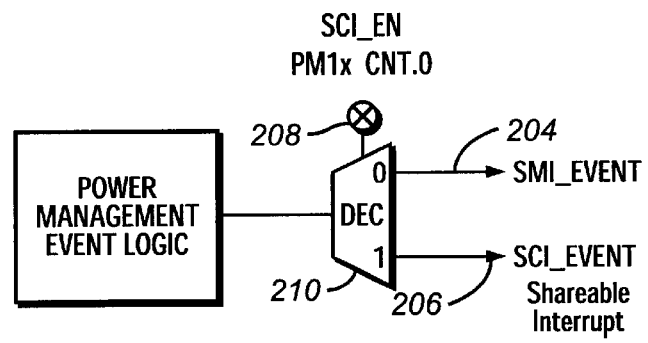
FIG. 5 is a schematic electrical circuit diagram of the prior art of a decoder of the switchable legacy/ACPI compatible event model of FIG. 2.

Referring now to FIG. 2 and to FIG. 5, an example of a structure for a switchable legacy/ACPI compatible event model is shown. Some ACPI-compatible systems are compatible only with ACPI events, while other systems may be switched between a legacy mode (System Control Interrupt disable) and a dual mode in which both legacy and ACPI-compatible events are detected (System Control Interrupt enable). As shown in FIG. 2, many ACPI-compatible systems provide a mechanism that enables the operating system to disable ACPI. When ACPI is disabled, the OS unloads all ACPI drivers. The OS finishes using all ACPI registers. The OS issues an I/O access to the port at the address contained in the SMI_CMD field (in the Fixed ACPI Description Table) with the value contained in the ACPI_DISABLE field (also in the Fixed ACPI Description Table). The system Basic Input Output System then remaps all System Control Interrupt events to legacy events and resets the System Control Interrupt Enable Signal, also referred to as the SCI_EN bit 208. Upon seeing the SCI_EN bit 208 cleared, the ACPI operating system passes control to the legacy mode.

Although many ACPI-compatible systems retain System Management Interrupt arbiters to decode legacy events in a legacy environment, System Control Interrupt events, however, require ACPI to interpret. The System Management Interrupt arbiter calls OS-transparent p-code provided by the manufacturer of the device generating the System Management Interrupt event, while the System Control Interrupt arbiter is OS-visible and either calls the device driver via the ACPI driver, if the event is a General Purpose Event, or is handled by the arbiter itself, if the event is a fixed event. As will be described below, both Fixed and General Purpose Events are supported by ACPI. In the example of the system shown in FIG. 2, events are routed to the appropriate arbiter by a decoder 210. Hardware events 202 are multiplexed between a System Management Interrupt arbiter 204 and a System Control Interrupt arbiter 206, and are enabled by a System Control Interrupt Enable Signal, SCI_EN bit 208. In a corresponding ACPI-only system, Device Idle Timers 212, Device Traps 214, and the Global Standby Timer 216, and the System Control Interrupt arbiter 206 are all replaced by the ACPI operating system. The operating system performs its own timing, arbiting, and routing of signals, and calls drivers based on events detected in the General Purpose Event registers.

When an OS-transparent event is detected requiring no OS support, such as a manufacturer-specific function requiring only hardware or manufacturer-supplied software support, the event is routed as a System Management Interrupt to the appropriate destination. When an Interrupt event is detected, requiring direct OS handling, the event is routed to the System Control Interrupt resource (if ACPI has been loaded and has created System Control Interrupt resources) or to a mapped System Management Interrupt in a legacy environment. ACPI operating systems use the System Control Interrupt handler to respond to events, rather than some type of transparent interrupt handler to respond to these events. Typically, Legacy systems used an System Management Interrupt handler. Generally, ACPI compatible hardware has both a Legacy mode and an ACPI compatible mode, and the mode is selected by the ACPI-awareness of the operating system. An ACPI operating system, when loaded and executed, initially scans the system Basic Input Output System tables to determine whether the hardware supports ACPI. If ACPI is not enabled, as indicated by a particular bit within the hardware, an ACPI activate command is issued to the System Management Interrupt handler through the System Management Interrupt command port.

Figures 4A, 4B:
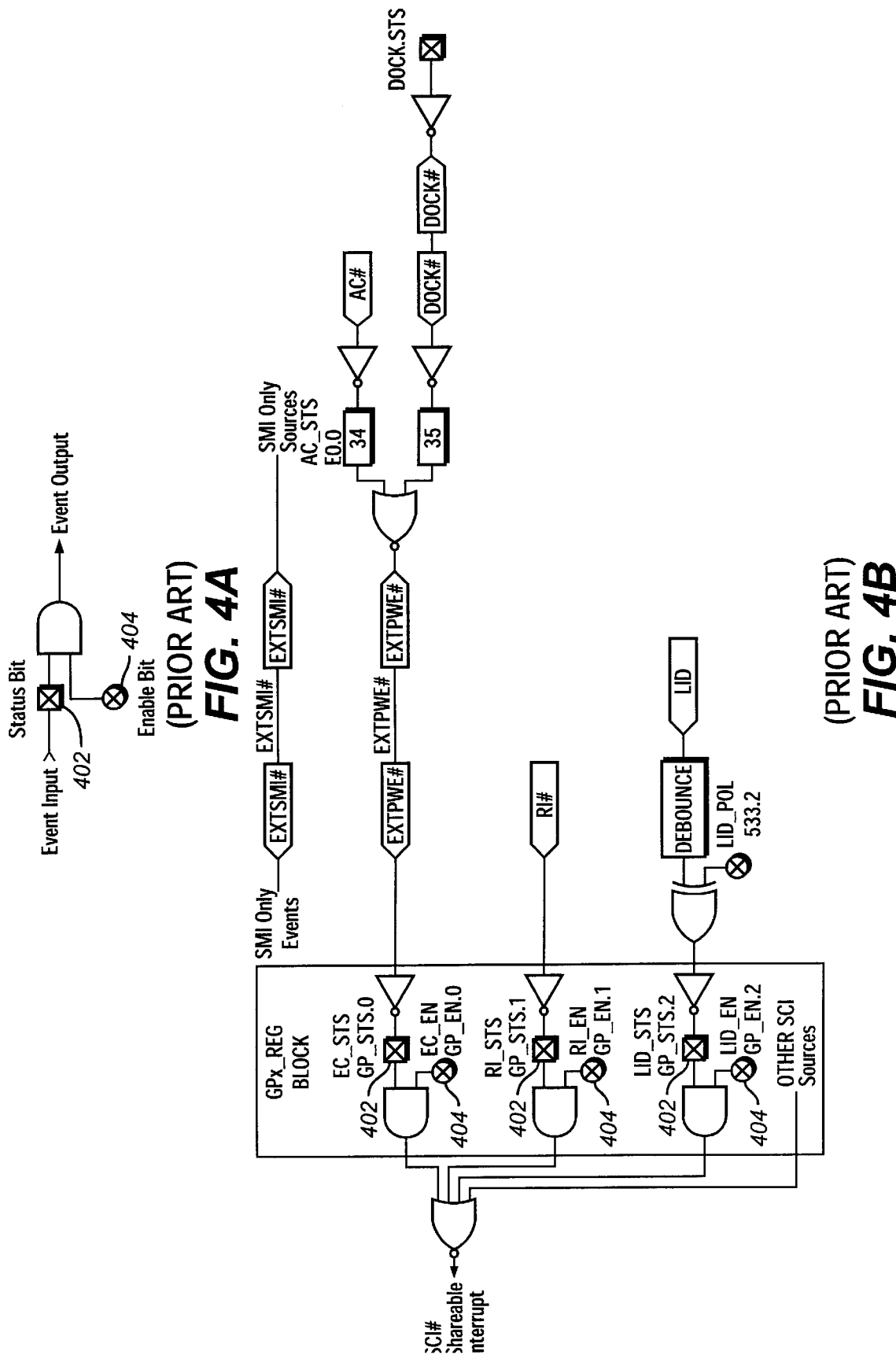
FIG. 4A is a schematic electrical circuit diagram of the prior art of the General Purpose Event register status and control bit, showing the control of the status and enable bits over event response.
FIG. 4B is a schematic electrical circuit diagram of the prior art of a General Purpose Event register having a number of status bits and a number of enable bits.

When the System Control Interrupt arbiter and the ACPI driver require access to a device driver, the selection of the device driver is found in a table created during boot-up. During boot-up of an ACPI-compatible system, the ACPI-compatible system Basic Input Output System builds an ACPI table, referred to as a Fixed ACPI Description Table (FACP), in memory. The Fixed ACPI Description Table contains a list of 32-bit pointers, addressing various Status/Enable Register blocks and various Control Register blocks. Referring now to FIG. 4A and FIG. 4B, each Status/Enable Register block contains a first register having a number of status bits 402 and a second register having a number of enable bits 404. The bits are used to control the output of events based on the events reported during runtime to the ACPI interface. The Fixed ACPI Description Table also contains a pointer to a first general purpose event register block and a second general purpose event register block, as well as the lengths of the general purpose event registers. Each of the general purpose event registers blocks contains a status register and an enable register. The Fixed ACPI Description Table includes an entry for each System Control Interrupt, mapping the System Control Interrupt to an OS-visible interrupt.

Referring now to FIG. 5, the decoder 210 of the switchable legacy/ACPI compatible event model (of FIG. 2) is shown in greater detail. Because an ACPI-compatible hardware platform may be configured in either an ACPI-compatible mode or a legacy OS mode, a platform register status bit SCI_EN that indicates whether the system has successfully entered into ACPI mode is set by the platform system Basic Input Output System in response to a request from an ACPI OS. When the ACPI OS loads, the OS scans the system Basic Input Output System tables to determine that the hardware supports ACPI, and then if it finds the SCI_EN bit 208 reset (indicating that ACPI is not enabled), issues an ACPI activate command to the System Management Interrupt handler through the System Management Interrupt command port. The system Basic Input Output System acknowledges the switching to the ACPI model of power management by setting the SCI_EN bit 208. This bit can also be used to switch over the event mechanism as illustrated in FIG. 2 and in FIG. 5.

2. ACPI-Compatible Chip Sets and General Purpose Event Registers

Figure 6A:
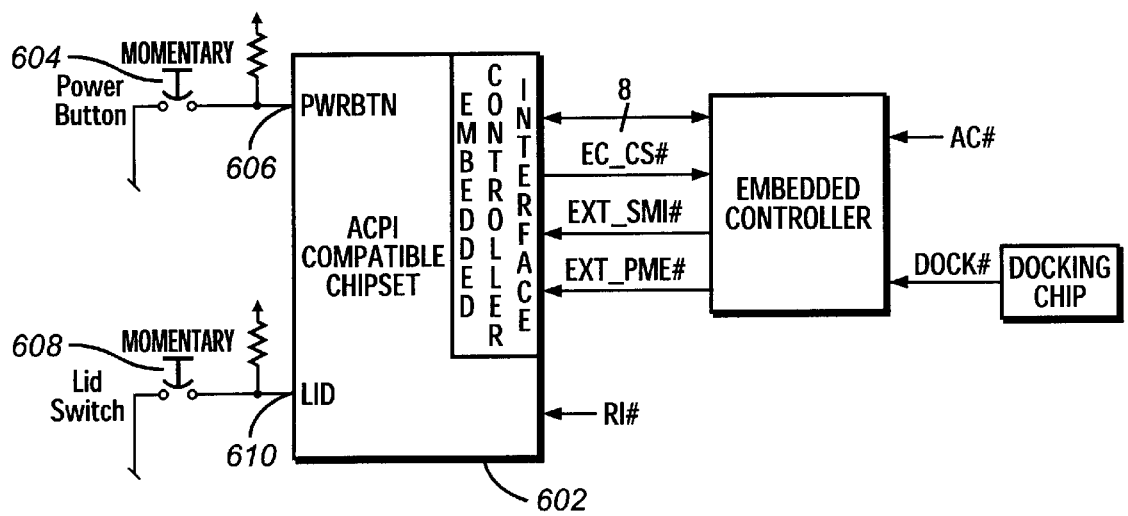
FIG. 6A is a schematic diagram of the prior art of an ACPI compatible chip set that contains General Purpose Event (general purpose event) registers that provide General Purpose Event input pins for various events.

Referring to FIG. 6A, an ACPI compatible chip set contains General Purpose Event registers that provide General Purpose Event input pins for various events. To create an ACPI-compatible system, the platform designer wires the General Purpose Event register pins, each General Purpose Event register pin being connected internally to one of the General Purpose Event register bits, to the various value added event hardware. By convention, General Purpose Event register pin names contain extension labels indicating the type of device wired to the particular pin, in addition to or instead of the _STS and _EN extensions. For example, power button 604 is wired to a _PWR-type General Purpose Event register pin 606 in the ACPI-compatible chip set 602. A lid switch 608 is wired to a LID# switch pin 610 (active-low). The ACPI machine language/ACPI source language code describes to the OS how to utilize these events. Some General Purpose Event events may be left not wired to anything, and are therefore not utilized by the platform and have no associated ACPI source language/ACPI machine language code. Generally, these event pins are tied inactive such that the corresponding System Control Interrupt status bit in the General Purpose Event register is not set by a floating input pin.

Thus, the ACPI-compatible system has a number of General Purpose Event Registers for use in connecting the platform to external devices. Various devices may be connected via the General Purpose Event Register blocks to the ACPI-compatible system. The General Purpose Event Registers are defined as being set only in hardware, via direct connection to external devices, and as being read and cleared exclusively by the ACPI driver. The ACPI driver is driven by a logical OR of all of the status bits, such that when any status bit is set the ACPI driver is executed. The ACPI driver accesses General Purpose Event registers through byte accesses (regardless of their length). The ACPI driver owns the general-purpose event resources and these bits are only manipulated by the ACPI driver; other software such as ACPI source language/ACPI machine language code cannot access the general-purpose event registers. To operate in the ACPI environment, a status bit 402 and an enable bit 404 of the status and enable registers, respectively, is typically dedicated to the device. The status bit 402 connected to the device by external logic 620.

The general purpose event registers contain the root level events for all generic features. When an event is detected, the ACPI driver reads the General Purpose Event registers and determines that both a status bit and a corresponding enable bit 404 are set. The driver then accesses a device's driver based upon a detection of which status bit is set, if the corresponding enable bit 404 is also set. Because each device (or, in some systems, a few related devices) is coupled to a single, dedicated bit of the General Purpose Event registers, the general purpose event registers are used to identify the proper event handler for the event.

For example, an embedded controller may be so connected. Accordingly, an EC_STS bit and an EC_EN bit are defined in the status and enable registers, respectively. These bits allow the ACPI driver to communicate with an ACPI-aware embedded controller device driver. The EC_STS bit is set when either an interface in the embedded controller space has generated an interrupt or the embedded controller interface needs servicing. As with any other device, a particular, dedicated General Purpose Event register bit must be directly coupled in hardware to the device itself. If a platform uses an embedded controller in the ACPI environment, then the embedded controller's System Control Interrupt output must be directly and exclusively tied to a single General Purpose Event input bit.

3. The Structure of the General Purpose Event Registers

The structure of the General Purpose Event registers and the processing of interrupt handling is now described in detail, to provide understanding of the prior-art need for hardware connection.

Referring now to FIG. 3, a General Purpose Event status register block is shown. An ACPI compatible system typically has two General Purpose Event register blocks, each containing two registers. Separate register blocks, each with an address and length, are stored in the Fixed ACPI Description Table. Having multiple General Purpose Event register blocks allows the ACPI-compatible system to partition the root events, increasing the flexibility of the system. The two General Purpose Event register blocks are separate register blocks and are not a register grouping, because there is no need to maintain an orthogonal bit arrangement.

Each register block contains a pair of registers: a general purpose event status register, containing the General Purpose Event status bits, and a general purpose event enable register, containing the General Purpose Event enable bits. Each status bit is paired with a corresponding enable bit in the other register of the pair, and each pair of bits corresponds to a distinct general purpose event that the general purpose registers can detect. When the enable bit is set, the SCI occurs, if the status bit is set.

The four General Purpose Event registers are labeled as follows. The status register and the enable register associated with a General Purpose Event register block 0 (GPE0_BLK), are labeled GPE0_STS and GPE0_EN, respectively, and each has a length in bytes referred to as GPE0_LEN. The status register and the enable register associated with a General Purpose Event register block 1 (GPE1_BLK), are labeled GPE1_STS and GPE1_EN, respectively, and each has a length in bytes referred to as GPE1_LEN. The bits in each register are grouped into bytes, and the number of bytes defines the length of the register, the number of bytes being shown in the second column of FIG. 3. Thus, the register block has a length that is double the length of any one register (that is, each register's length is defined to be half the length of the corresponding register block) since the block contains two registers.

The Fixed ACPI Description Table is a collection of registers, including the general purpose event registers. Each general purpose event register's address, length, and contents are stored in the Fixed ACPI Description Table. The general-purpose event status and enable bits themselves are stored in bank zero of the general-purpose registers, within the table. Each bit of the status registers are hard-wired by the manufacturer to receive event signals from devices, and are readable by the ACPI driver and by the operating system.

Each register in each of the register blocks is accessed as a byte, according to its length (block length divided by two). It is up to the specific design to determine if the bits in each register retain their context across sleeping or soft-off states.

The status bits are set by hardware. Each available status bit in this register is set when the event is active, and can only be cleared by software writing a one to its respective bit position. Each status bit can optionally wake up the system if asserted when the system is in a sleeping state with its respective enable bit 404 set. Waking the system requires applying power to the microprocessor and other necessary devices before routing the event to an event handler. For the general-purpose event registers, unimplemented bits are ignored by the operating system. The ACPI driver accesses General Purpose Event registers through byte accesses (regardless of their length).

When the enable bit 404 is set, then a set status bit in the corresponding status bit 402 will generate a System Control Interrupt. When an event is detected, the general purpose event registers are used to identify the proper event handler for the event. Identifying the proper event handler for the event, however, first requires identifying the type of event that has occurred.

4. Platform Devices

An ACPI compatible system typically has other hardware required for ACPI-compatibility. Many platforms can be configured in either an ACPI environment/mode (when an ACPI-compatible OS is loaded) or a legacy environment/mode (when a non-ACPI OS is loaded). (Throughout the description of the drawings, the term "environment" and "mode" will be used interchangeably, to indicate whether the particular operating system running on the system is ACPI-aware.) ACPI-compatible hardware can choose to support both legacy and ACPI modes or just an ACPI mode; that is, some systems are configurable only in an ACPI-compatible mode.

Many, though not all, ACPI-compatible devices, including platform devices, use p-code to define control methods specific to each device. P-code control methods, typically written in ACPI control method source language (ASL) pseudocode and compiled into the ACPI control method Machine Language (AML), define a set of control methods for each device. Control methods are called from the operating system, allowing the operating system to interface with the device.

5. ACPI-Compatible Systems and Access of Device P-Code When at Least One of the General Purpose Event Status Bits is Asserted Referring again to FIG. 2, ACPI recognizes three types of events, distinguished by the portion of the system that responds to each event: hardware events, interrupt events, and OS transparent events. Hardware events 202 require unconditional performance of an action from system hardware, and operate similarly in both an ACPI-aware and legacy system. Hardware events 202 include "wake up," "unconditional sleep," and "reset." Interrupt events, supported by ACPI-aware but not by legacy operating systems, require execution of ACPI machine language code or an ACPI-aware driver. Interrupt events, however, allow external hardware events 202 to drive the system firmware. Interrupt events are mapped to OS-transparent System Management Interrupts (SMI's) when a legacy OS is loaded, and to OS-visible shareable interrupt (SCI# ) when an ACPI-aware OS is loaded. Several typical System Management Interrupts include power-related interrupts such as power button, lid open/close, or sleep button signals, and plug-and-play related events such as device-dock or status change. When an ACPI OS is loaded, interrupt events are mapped to OS-visible sharable interrupts. These interrupts can be accessed and used by the operating system.

The third type of event, the OS-Transparent event, has no support in ACPI, and is used by manufacturers to allow external hardware to communicate with the system software other than the operating system. Because hardware events 202 communicate directly with system hardware, and because OS-Transparent events have no support in ACPI, interrupt events are the primary concern in event handling.

From a purely hardware perspective, a different way of viewing events is to distinguish fixed events from general purpose events. Although there are both fixed event registers and general purpose registers in an ACPI-compatible system, the General Purpose Event registers provide multiple levels of event handling within the platform. Whereas fixed event registers cause the ACPI to read and handle the event register itself, the general purpose event registers access either an ACPI-driver or a manufacturer-supplied control method to handle each event. General Purpose Events in an ACPI environment are handled by the System Control Interrupt handler. In turn, the general-purpose events can be used to provide further levels of events to the system. And, as in the case of the embedded controller, a well-defined second-level event dispatching is defined to make a third type of typical ACPI event. For the flexibility common in today's designs, two first-level general-purpose event blocks are defined, and the embedded controller construct allows a large number of embedded controller second-level event-dispatching tables to be supported. Then if needed, the manufacturer can also build additional levels of event dispatching by using ACPI machine language code on a general-purpose event to sub-dispatch in a manufacturer defined manner. Events may also be categorized based on whether the signal is edge- or level-asserted, and whether an ACPI-operating system was active when the event was received.

Once the type of event has been determined, the operating system must use the proper event handler. The first type of event, hardware events are routed to the appropriate hardware. The third type of event, the OS transparent event, is likewise routed to the appropriate manufacturer-provided control method, without accessing by the operating system. However, the second type of event, the interrupt event, is routed based on whether an ACPI-aware operating system is active. The proper interrupt handler must be selected. Interrupt events, as explained above, allow external hardware events 202 to drive the system firmware.

Selection of the interrupt handler depends on whether an ACPI-aware operating system is loaded and active, i.e., whether SCI_EN bit 208 is set. Interrupt events are mapped to OS-transparent System Management Interrupts (SMI's) when a legacy OS is loaded (legacy mode), and to OS-visible shareable interrupt (SCI# ) when an ACPI-aware OS is loaded (ACPI-compatible mode). In other words, the ACPI-compatible handling of interrupt events is enabled by the SCI_EN bit 208. For the ACPI-compatible mode, the SCI_EN bit 208 is set, and handling of interrupt events is routed to the sharable system control interrupt arbiter 206. For legacy mode, the SCI_EN bit 208 is reset, and the interrupt event is routed to the System Management Interrupt arbiter 204 instead. For ACPI-only hardware lacking a switchable modality, of course, it will be apparent that the SCI_EN bit 208 is always set.

Upon receiving a general-purpose event that is identified as an interrupt, the SCI arbiter 206 accesses the ACPI driver, which either passes control to an ACPI-aware driver, or uses a manufacturer-supplied control method, to handle the event. The ACPI driver disables the interrupt source (General purpose event register block, containing the General Purpose Event status and enable registers), if only momentarily. Disabling the input source prevents a subsequent interrupt received while the current interrupt is being handled from being confused with the current interrupt.

The ACPI driver determines which status bit, among the status bits in the general purpose event register, is asserted. As indicated above, each status bit, and its corresponding enable bit, is hard-wired and dedicated to receive a particular event. The selection of a control method or device driver is determined by which bit received the signal indicating the event.

As stated previously, each register in each of the register blocks is accessed as a byte, according to its length (block length divided by two). According to the hardware requirements imposed on the manufacturer by the ACPI specification, therefore, a manufacturer can implement between zero and 255 general-purpose event inputs in hardware, each as either a level or edge event. The General purpose event status register, containing the General Purpose Event status bits, thus allows 255 events (i.e., status register values), identified as 00h-FFh. Bits in the General purpose event register block, containing the General Purpose Event status and enable registers, are indexed with a number from 0 through FF.

The name of the control method to queue for an event raised from a status bit is of the form \_GPE._Exx or \_GPE._Lxx where xx is the event value where L or E indicates the event EIO protocol to use (either edge or level). The manufacturer's control method code is identified if it belongs to an object that has a process name of \_GPE._Exx or \_GPE._Lxx, where xx indicates (in hex) one of the 255 events and "E" or "L" corresponds to the event type (edge or level). The manufacturer's control method code can perform manufacturer-specific functions custom to each event the particular platform might generate by executing a control method that matches the event.

A list of entry points, or offset vectors, to the control methods in memory is maintained in the table. For the status bits in the General Purpose Event register block 0 (GPE0_BLK), the list begins at event-zero (_E00 or _L00) and end at event-N, where N is one less than the length of the general purpose event register block 0 (i.e., GPE0_BLK_LEN−1). For the status bits in General Purpose Event register block 1 (GPE1_BLK), the list begins at a base address GPE1_BASE and ends at M, wherein M is one less then the sum of base address and the length of the General Purpose Event block 1. The base address of the General Purpose Event register 1 (GPE1_BASE), and the lengths of the General Purpose Event blocks (i.e., the GPEx_BLK_LEN) are all defined in the Fixed ACPI description table, within the Fixed ACPI Description Table.

When a device signals its an event, the particular general-purpose status event bit used to track that device is set. While the corresponding general-purpose enable bit 404 is enabled, the System Control Interrupt is asserted. If the system is sleeping, this causes the hardware, if possible, to transition the system into an operating state. Once the system is running, ACPI dispatches the corresponding General Purpose Event handler. The handler determines which device object has signaled the event and performs a Notify operation on the corresponding device object(s) that have asserted the event. In turn, the OS notifies the OS native driver(s) to service each device that has asserted Wake.

The ACPI driver also calls a _PRW object method when a Wake Event is detected. A device's _PRW object provides the zero-based bit index into the general-purpose status register block to indicate which general-purpose status bit from either the General Purpose Event register block 0 (GPE0_BLK) or General Purpose Event register block 1 (GPE1_BLK) is used as the specific device's wake mask. Although the hardware must maintain individual device wake enable bits 404, the system can have multiple devices using the same general-purpose event bit by using manufacturer-specific hardware to provide second-level status and enable bits 404. In this case, the manufacturer ACPI machine language code is responsible for the second-level enable and status bits.

The OS enables or disables the device wake function by enabling or disabling its corresponding General Purpose Event and by executing its _PSW control method (which is used to take care of the second-level enables). When the General Purpose Event is asserted, the OS still executes the corresponding General Purpose Event control method that determines which device wakes are asserted and notifies the corresponding device objects. The native OS driver is then notified that its device has asserted wake, for which the driver powers on its device to service it. If an _PWR object is found, the ACPI driver manages a wake event using device _PWR objects. For example, suppose a manufacturer supplies a wake event for a communications port and uses bit 4 of the General Purpose Event0_STS bits to raise the wake event status. In a manufacturer-provided Definition Block, there must be a Method declaration that uses the name \_GPE._L04 or \General Purpose Event_E04 to handle the event. An example of a control method declaration in conventional computer programming language format using such a name is the following:

```
Method(\_GPE._L04) {    // General Purpose Event 4 level
                        wake handler
    Notify (\_SB.PCIO.COM0, 2)
}
```

The control method performs whatever action is appropriate for the event it handles. For example, if the event means that a device has appeared in a slot, the control method might acknowledge the event to some other hardware register and signal a change notify request of the appropriate device object. Or, the cause of the general-purpose event can result from more than one source, in which case the control method for that event determines the source and takes the appropriate action.

Thus, each device must have a direct and exclusive hardware-based electrical connection to a particular bit of the status registers. One example of such a device, and its need for a direct and exclusive hardware-based electrical connection to a particular bit of the status registers, is the embedded controller. Certain device support, such as an embedded controller, requires a dedicated General Purpose Event to service the device. Such General Purpose Events are dispatched to native OS code to be handled and not to the corresponding General Purpose Event-specific control method. For example, the EC_STS and EC_EN bits are defined to enable the ACPI driver to communicate with an ACPI-aware embedded controller device driver.

Embedded controllers present a commonly found special case. When a general-purpose event is raised from the General Purpose Event bit tied to an embedded controller, the embedded controller driver uses another naming convention defined by ACPI for the embedded controller driver to determine which control method to queue for execution. The queries that the embedded controller driver exchanges with the embedded controller are numbered from 0 through FF, yielding event codes 01 through FF. (A query response of 0 from the embedded controller is reserved for "no outstanding events.") The name of the control method to queue is always of the form _Qxx where xx is the number of the query acknowledged by the embedded controller. An example declaration for a control method in conventional programming language format that handles an embedded controller query is the following:

```
Method(\_Q34)  {     // embedded controller event for thermal
    1 Notify (\_TZ.THM1,    0 × 80)
}
```

The status bit is then cleared if the event is a level event (the status bit was previously cleared if the event is an edge event). The status bit is the re-enabled, to allow a subsequent interrupt to be handled by the system.

With respect to the embedded controller, the EC_STS bit is set by a direct electrical connection when either an interface in the embedded controller space has generated an interrupt or the embedded controller interface needs servicing. If a platform uses an embedded controller in the ACPI environment, then the embedded controller's System Control Interrupt output must be directly and exclusively tied, via a direct electrical connection, to a single General Purpose Event input bit. The ACPI driver manages the bits in the General Purpose Eventx blocks directly, although the source to those events is not directly known and is connected into the system by control methods.

In the case of the embedded controller, the OS-native, ACPI-aware driver is given the General Purpose Event for its device. This r services the embedded controller device and determines when events are reported by the embedded controller by using the Query command. When an embedded controller event occurs, the ACPI-aware driver queues control methods to handle each event. Another way the manufacturer ACPI machine language code can perform manufacturer-specific functions custom to each event on the particular platform is to queue a control method to handle these events. For an embedded controller event, the ACPI driver will queue the control method of the name _QXX, where XX is the hex format of the query code. Note that each embedded controller device can have query event control methods.

The ACPI specification recognizes the difficulties inherent in migrating legacy hardware to an ACPI-compatible model. To implement the migration, ACPI-compatible systems allow system events to notify the operating system or other software that action, typically from the ACPI driver or ACPI machine language code, is needed. When configured for an ACPI environment, manufacturer devices must operate differently, or must be equipped with ACPI hardware extensions for ACPI-compatibility. Hardware events 202, however, from ACPI-compatible hardware must operate as similar hardware events 202 from legacy hardware have operated, except that the legacy hardware interrupt is translated to an ACPI-compatible System Control Interrupt event in the ACPI environment.

6. Development of ACPI Platforms

Platform development is an extremely complex process. Design changes may be necessitated by inclusion of previously-unincluded platform hardware devices, ACPI-aware operating systems, device drivers, and manufacturer-defined ACPI-extensions (written in p-code); such compatibility-oriented changes expand the functionality of the platform. Other changes are required because a design defect has been discovered, or because a superior design has been found; such changes restore the functionality of the platform. ACPI-compliant platform hardware must interpret and pass to the operating system whatever signals are found on the General Purpose Event registers. Regardless of the reason for the design change, however, design changes add expense and delay to product development, particularly if the changes are made during the later stages of product development. Depending on the degree of change necessary, the cost and delay can be significant.

It is unrealistic to expect all design "bugs" or problems can be anticipated in the initial stages of platform design, or that the platform designers will anticipate every need in designing the General Purpose Event status circuitry. Moreover, even after an ACPI-compliant platform is developed, subsequent improvements are often difficult to retro-fit into existing systems.

Hardware and interrupt events occurring during a sleep state are particularly problematic, since the microprocessor may not have sufficient power to handle the event. For example, the Intel PIIX 4 "ACPI Ready" chip set does not readily support system wake-up from the keyboard. As explained above, when an ACPI general purpose event register receives an interrupt event from a keyboard, or from any other device, the event register routes the interrupt to the appropriate arbiter, which accesses the ACPI driver. The ACPI driver then accesses the control method and device driver of the device. Unfortunately, such interrupt-handling ACPI-compatible hardware typically assumes that power is being applied to the microprocessor.

To transition from a soft-off or sleep state to an operational state, a hardware event is needed, routed to the power-providing hardware. In an ACPI environment, wake events are within the power-management control of the operating system, since ACPI replaced the Advanced Power Management and second-generation Advanced Power Management (APM2) interface requirements. Yet the operating system needs a powered-on system to run.

Figure 6B:
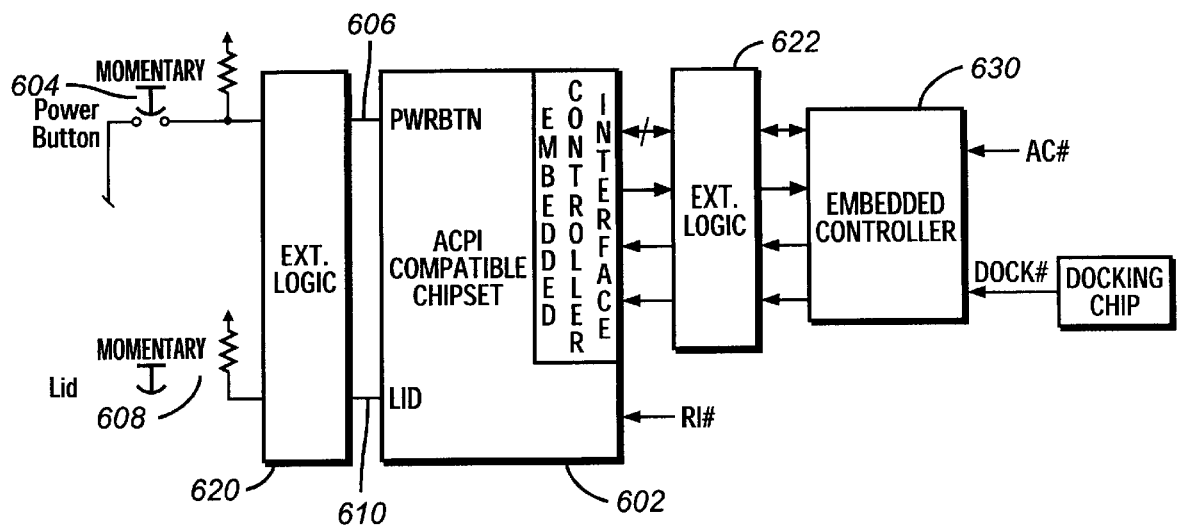
FIG. 6B is a schematic diagram of the prior art of a hardware solution to retrofitting external circuitry into an existing platform design with the present invention.

Referring to FIG. 6B, to correct this deficiency, platform designers may create a hardware wake-device within external logic 620. The external logic 620 detects an event that would otherwise be treated as an interrupt. The external logic 620 further detects the power state of the system. If the power state is insufficient to perform as necessary in light of the event, then the external logic 620 generates a wake state followed by an interrupt. In other words, the external logic 620 creates an additional event (the hardware wake event) before the interrupt. The wake event sets the System Control Interrupt status bit corresponding to the device that instituted the wake event. The General Purpose Event register bit is routed to the core chip set (e.g., the ACPI chip set) to generate a wake event, which wakes the machine. The OS then clears the bit and handles the event that caused the wake-up. A Notify command indicates to the OS (in software) what device caused the wake-up. The problem with the Intel PIIX 4 "ACPI Ready" chip set is internal to the chip set itself, and is difficult to remedy without complex external circuitry.

The platform also contains an ACPI-aware operating system for calling the ACPI driver when at least one of the bits of the General Purpose Event registers is asserted, and for calling an appropriate device driver depending on the particular status bit asserted. However, as shown in FIG. 6B, either the platform does not comply with the design, or the design does not comply with the specification. The platform is therefore compensated with external hardware, in particular with external logic 620, to provide proper functionality and ACPI-compliance.

It may be noted that several reasons may justify adding external logic 620 late in the design process. Although described as compensating the hardware for problems discovered during platform development, the external logic 620 may also add additional functionality to the General Purpose Event status circuitry.

As compensated, the platform performs properly. Devices connected to the General Purpose Event register pins assert signals on the General Purpose Event registers that indicate events, such as interrupts, that request service from the platform. Hardware events 202 are interpreted by the external logic 620 and directed to the appropriate hardware component on the platform. OS-transparent events are interpreted by the external logic 620 and directed to manufacturer-specified routines. OS-visible interrupts are interpreted by the external logic 620 and directed to the ACPI driver. Whereas some of the events may not have been interpreted correctly had the events been communicated directly to the ACPI driver without first passing though the external circuitry, in the structure shown in FIG. 6B the external circuitry compensates for the original defects in the platform design.

However, although the platform performs properly with the external logic 602 coupled between the chip set 620 and the event input power button 604 and lid switch 608, it will also be recognized that physical die space on most system-board designs is limited. As the complexity of the external logic 620 and circuitry increases, the additional circuitry must be accommodated within the physical structure of the platform. Also, additional circuitry, particularly if highly complex, can add propagation delays through the circuits, both through the connector and through the gates. All of these factors can become problematic.

Moreover, the compensation by addition of external logic 620 may be considered an additional development step. As changes are made to the hardware design, the new development step requires external logic 620 to be developed for connecting the changed hardware design to the General Purpose Event register bits. The external logic 620 must provide the necessary connections, and must also be implemented on the platform within the physical space available. Timing considerations, such as latency through the external logic 620, must be evaluated, and can detract from the performance of the system. Thus, the hardware-implemented external logic 620 design is not optimal.

Referring again to FIG. 6B, it will be recognized that the inability to process wake events properly is only one example of a platform design deficiency correctable through the addition of external logic 620. FIG. 6B shows generally a hardware solution to retrofitting external circuitry into an existing platform design. To create an ACPI-compatible system, the platform designer wires the General Purpose Event register pins, each General Purpose Event register pin being connected internally to one of the General Purpose Event register bits, to the various value added event hardware via external logic 620. Power button 604 is wired via external logic 620 to a _PWR General Purpose Event register pin 606 in the ACPI-compatible chip set 602. A lid switch 608 is wired via external logic 620 to a LID# switch pin 610 (active-low). The hardware solution of FIG. 6B is presented for explanatory and comparison purposes, and does not form part of the software-controlled General Purpose Event register structure of the present invention.

Continuing to refer to FIG. 6B, external logic 620 compensates for problems with the ACPI-compatible chip set 602 that are discovered too late in the design process to be cost-effectively implemented in the ACPI-compatible chip set 602 itself As shown in FIG. 6B, an ACPI-compatible platform, containing an ACPI-compatible chip set 602, is designed. In the later stages of platform development, however, design problems are discovered rendering the ACPI-compatible chip set 602 inferior or unsatisfactory in performance. Like the platform shown in FIG. 6A, the ACPI-compatible platform is designed to contain circuitry for accessing the General Purpose Event registers, and for detecting which of the General Purpose Event status bits is asserted.

Devices, also, must comply with the ACPI specification. Both ACPI-compliant platforms and ACPI-compliant devices are under development by hardware designers, subject to the proposed interface provided by the General Purpose Event status circuitry. Because the ACPI paradigm is, in part, directed to the elimination of the Basic Input Output System as a configuration element, and its replacement by the ACPI-aware operating system, device hardware must also be compatible with the ACPI requirements. Therefore, hardware must be compatible with the General Purpose Event registers. The registers themselves cannot easily be reconfigured by the external device, and therefore, the device must be coupled directly to the proper pins of the General Purpose Event registers. This hardware compatibility with the General Purpose Event register configuration is particularly constricting, since the General Purpose Event register has a finite and limited number of pins available and has stringent requirements for compatibility.

Referring again to FIG. 6B, a device in an early stage of the design process, designed to have an ACPI-compatible hardware configuration, is shown. The device has a set of pins for connecting to the General Purpose Event registers on the platform, as in the prior art. The device further has an intelligent component that processes software. As required by the ACPI specification, the device has an output pin (or set of output pins) that may be connected directly to the General Purpose Event register bits on a system platform. The device is designed to provide an output as required by ACPI when the device needs service from a device driver residing in memory and executable on the system processor.

Unfortunately, not all design problems can be anticipated. Design often requires many processing steps, trial-and-error, and educated guesses to arrive at a robust and error-free solution. Thus, although the device in FIG. 6B is designed to have an ACPI-compatible hardware configuration, it is to be assumed in understanding FIG. 6B that a design defect has been discovered in the ACPI-compatible chip set 602 that renders the chip set 602 non-compliant with ACPI.

For example, as designed the device does not include a device-enable signal that is necessary for proper operation of the device. The hardware solution of FIG. 6B also shows external logic 622 coupling the ACPI-compatible chip set 602 to an embedded controller 630. The hardware solution is to provide an external logic 622 that receives the enable signal and performs a set of logical operations of the enable signal with the output of the device. The output of the set of logical operations is then provided to the General Purpose Event register bit. The General Purpose Event register bit operates as though the signal comes directly from the device. When the set of logical operations produces an asserted signal to both the status and the enable bits 404 of one of the General Purpose Event register, the ACPI driver is called. The ACPI driver detects the assertion of a status bit and an enable bit 404 of the General Purpose Event register, and calls the appropriate driver according to the particular General Purpose Event register pin asserted and according to the Fixed ACPI Description Table.

Thus, a new development step is required for the device, similar to the step required for the platform. As changes are made to the hardware design, the new development step requires external logic 622 to be developed for connecting the changed hardware design to the General Purpose Event register bits. The external logic 622 must provide the necessary connections, and also be implemented on the device within the physical space available, and timing considerations, such as latency through the external logic 622, must be evaluated.

It will be recognized that the device-enable signal and the set of logical operations is an extremely simplified, perhaps overly-simplified, example of external logic 622 needed to retro-fit a device hardware change into existing hardware requirements. However, the example of the set of logical operations serves to show, in an understandable way, external logic 622 as previously necessary for the ACPI-compliant hardware. It will be apparent that many far more complex (and far more expensive) external logic 622 changes may become necessary to retain ACPI-compatibility throughout the debugging and product-development of the device.

7. The Present Invention and its Solution to the Problems

Figure 6C:
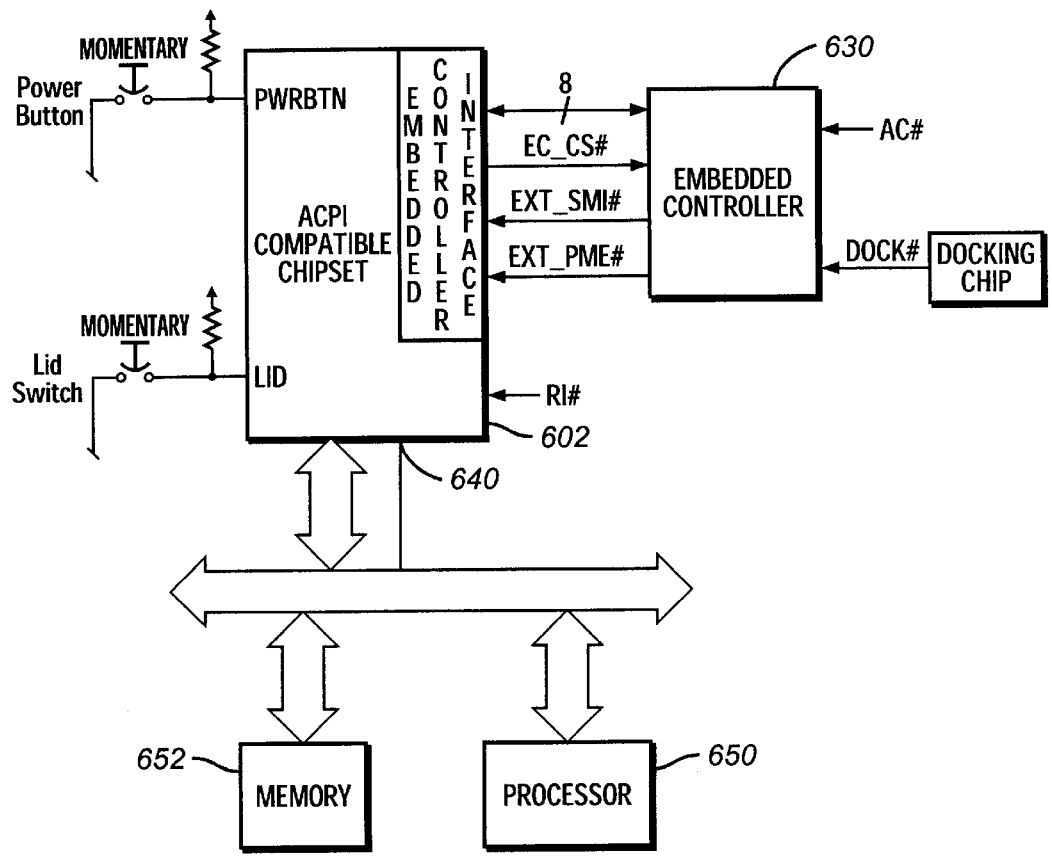
FIG. 6C is a schematic diagram of a software solution to the problem, according to the present invention.

Referring now to FIG. 6C, a software solution to the problem is presented, according to the present invention. The software solution eliminates the need for external circuitry or logic to provide ACPI-compatibility with the General Purpose Event register bits, by allowing the device to produce General Purpose Event-compliant signals despite changes in the design of the device itself.

As shown in FIG. 6C, a configuration register bit 640 is provided in the PCI configuration register space corresponding to the device. The configuration register bit 640 is software controlled, rather than hardware controlled, and allows write-access to the General Purpose Event register within the chip set 602. The configuration register bit 640 must be enabled prior to writing to the General Purpose Event register and may be disabled to prohibit inadvertent writes to the General Purpose Event register.

Software running on the system central processing unit 102 provides write access to the General Purpose Event registers via the configuration register bit 640. The configuration register bit 640 is therefore subject to software control. This allows software work-around to resolve problems that otherwise would require hardware modifications, by allowing the processor to access the registers, and to over-write the contents of the registers with a compensated set of general purpose event register bit values.

The operation of the embodiment of the present invention shown in FIG. 6C is now described in one exemplary event, for comparison with the operation of the structure shown in FIG. 6B. As shown in FIG. 6C, the platform contains a configuration register bit 640 in the PCI configuration register space. The configuration register bit 640 is set, which enables write access to the General Purpose Event status register. The configuration register bit 640 can be set by software running on the system platform. The configuration register bit 640 enables and disables writes to the General Purpose Event register. When the configuration register bit 640 is enabled, manufacturer-provided ACPI extension software p-code, within the manufacturer-supplied platform instrumentation, is able to access the ACPI driver directly.

Before sleeping, applications running on the system provide the operating system with a list of devices that will be able to wake the system, and the operating system sets the System Control Interrupt enable bit 208 for the device in the General Purpose Event enable register, as in the structure shown in FIG. 6B. However, in the present invention, the operating system is not the only software capable of setting the System Control Interrupt enable bit 208 for the device in the General Purpose Event register. The manufacturer-provided ACPI extension software p-code, within the manufacturer-supplied platform instrumentation, also accesses the ACPI driver directly.

The processor and other devices are put to sleep by reducing power provided to the minimal amount sufficient to allow the wake-up event to restore the system. Later, a device asserts a wake event to the ACPI chip set. The wake event sets the System Control Interrupt status bit corresponding to the device. The General Purpose Event register bit is routed to the core chip set 602 (e.g., the ACPI chip set 602) to generate a wake event, which wakes the machine. The OS then clears the bit 640 and handles the event that caused the wake-up. A Notify command indicates to the OS (in software) what device caused the wake-up. The Wake event, when received (even during the sleep states), is routed to the System Control Interrupt status register.

The software solution of FIG. 6C replaces both the external logic 620 and external logic 622. The configuration register bit 640 of the device is coupled to the central processing unit 102, and is also coupled to receive the signal from the chip set 602 indicating an event to the General Purpose Event register. The processor 650 along with a memory 652 includes a software routine that, during runtime, detects the assertion of a signal on the General Purpose Event register bit (e.g., the _PWR General Purpose Event register pin 606 or the LID# switch pin 610) connected to the device. The assertion of the signal on the General Purpose Event register bit connected to the device, rather than connecting to the General Purpose Event register directly, calls the software routine. The software routine corrects the assertion of the General Purpose Event register bit signal for any changes made to the device during the product development cycle of the device. The software routine obviates the need for external logic 620 and 622, and controls the interface of the chip set 602 with devices and General Purpose Event register bits.

Moreover, the software solution of FIG. 6C allows manufacturers to provide device drivers even for devices capable of producing only hardware events. As stated previously with reference to FIG. 2, hardware events 202 require unconditional performance of an action from system software. However, in the present invention, hardware events can cause the ACPI driver to access a device driver corresponding to a hardware event. For example, a wake-up event typically does not access the microprocessor of a computer system, since the microprocessor does not receive sufficient power during a sleep state to process the wake-up event. Wake-up events are normally hardware events commanding power supplies, batteries, and other devices into an active state. According to the present invention, hardware events can access a driver corresponding to the hardware event.

Thus, the development cycle of ACPI-compatible chip sets 602 is enhanced by ability to artificially generate General Purpose Events, and by the availability of software control over the platform/device interfaces. Hardware distribution of platforms can begin at an early stage in the cycle, since problems having a software solution can be remedied after initial steps in distributing platforms has begun. Manufacturers can select a method of wiring the various devices, since both external logic solutions and software solutions are possible; the manufacturer can select the approach that is more appropriate to the particular situation. In other embodiments, the software solution allows other devices in the system access to the chip set 602, such as other processors in the system or over a network, adding functionality to the General Purpose Event circuitry. More importantly, however, design defects, even those design defects discovered late in the design cycle can be easily and inexpensively compensated.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

Enable bits are read and written strictly by software, and indicate to the system whether an event occurrence from a particular device is to be reorganized. According to the standard ACPI operation, the status bit is set strictly in hardware, indicating whether an event has occurred. An event occurrence from a hardware device sets a status bit, corresponding to the device status bits are set in hardware, and are read both by hardware in order to cause the SCI event occurrence. Status bits are also read by software, and are reset solely in software. Status bits are set strictly hardware, are read in either hardware or software, and are reset strictly in software. The enable bit corresponding to that status bit (and to the device) may be set as well. Enable bits are exclusively set and reset in controlling software. There is no hardware access to enable bits whatsoever. The status bit and enable bit are ANDed together. The output of the AND-gate is asserted as an output, i.e. as an interrupt. The status bit reflects whether the event has occurred totally independent of the enable bit. When the enable bit is set the SCI will occur assuming that the event has taken place. The fixed ACPI description table is a collection of registers. The status registers are software readable by the ACPI driver. These are hardware readable in the context that the hardware has to be able to read the status bit in order to determine whether to generate the interrupt. The only way a status bit can be cleared is if the software writes to it. There is no way for the status bit context to be on.

The present invention sets status bits in software. In the prior art there is no software access to the status bits. When the enable bit is set, the status bit reflects whether the SCI event has occurred. The functioning of the status bit is independent from the enable bit. The status bit is a purely hardware function. A device asserts a signal to the status register when certain activities occur causing a status bit to be set. The setting of the status bit is a hardware function.

Whether an interrupt occurs so that the system can figure out whether that took place is strictly controlled by the enable bit. If the enable bit is not set then the system will never see that status event occur.

For example, a system requires that a signal be asserted when two related events occur in a given order. In other words, the second event is not to be seen by the system unless the first event has previously occurred. In such a system, the first event is initially enabled and the second event is disabled. If the second event occurs, it is not detected because the corresponding enable bit is off. If the first event occurs, the first event sets the enable bit of the second event. Subsequently, when the second event occurs, the second bit is detected because the corresponding enable bit is set.

What is claimed is:

1. A computer system comprising:
   a processor;
   a bus coupled to the processor,
   an ACPI-compatible core chip set coupled to the bus, the chip set having a register, the chip set configured to receive a plurality of signals indicating events; and
   a memory coupled to the bus, the memory configured to receive from the chip set a signal indicating that an event has been detected, the memory containing a set of instructions that when executed by the processor initiates a signal indicating event that is recognized by an operating system as a hardware event, thereby compensating signals received by the register.

2. The computer system of claim 1, wherein:
   the events indicated by the signals are hardware events; and
   the set of instructions, when executed by the processor, include a correction of hardware events for the chip set.

3. The computer system of claim 1, wherein the memory further contains an ACPI driver, the processor configured to access the driver upon detecting a hardware event.

4. The computer system of claim 1, wherein the instructions that when executed by the processor correct signals received by the register to improve the ability of the chip set to respond to hardware events.

5. The computer system of claim 1, further comprising a platform device, the memory further having a device driver corresponding to the platform device.

6. The computer system of claim 1, wherein the chip set further comprises:
   a control bit, within a Peripheral Component Interconnect (PCI) configuration register for enabling write access to the event register, the control bit being asserted upon execution of the set of instructions.

7. The computer system of claim 1, wherein the event register is a General Purpose Event status register having a plurality of bits, each of said bits coupled to a distinct signal of said plurality of signals indicating events.

8. In a computer system including a processor, a bus coupled to the processor, and a memory coupled to the bus, an electronic apparatus comprising:
   an event register configured to receive a first set of signals and to provide the first set of signals to the processor, the register further configured to receive a set of event indicating signals from the processor in response to the first set of signals and in response to a set of instructions in the memory to the processor the set of event indicating signals recognized by an operating system as a hardware event, thereby compensating signals received by the register.

9. The electronic apparatus of claim 8, wherein:
   the event register is configured to receive a signal from a device, among the first set of signals, the signal from the device indicating the occurrence of a hardware event, the set of instructions including a device driver corresponding to the device.

10. The electronic apparatus of claim 8, wherein:
    the event register is configured to receive a signal from a device, among the first set of signals, the signal from the device indicating the occurrence of a hardware event, the set of instructions including an Advanced Configuration Power Interface (ACPI) driver.

11. The electronic apparatus of claim 8, wherein the response of the electronic apparatus to the occurrence of hardware events is assigned lower priority compared to the response of the electronic apparatus to the occurrence of corrected signals.

12. The electronic apparatus of claim 8, wherein:
    the electronic apparatus is configured to direct the processor to execute a device driver corresponding to a pin of the event register receiving the first signal.

13. The electronic apparatus of claim 8, wherein the event register is a General Purpose Event status register having a plurality of bits, each of said bits coupled to a distinct signal of said plurality of signals indicating events.

14. The electronic apparatus of claim 13, wherein the electronic apparatus further comprises:
    a control bit, within a Peripheral Component Interconnect (PCI) configuration register for enabling write access to the General Purpose Event status register, the control bit being asserted upon execution of the set of instructions.

15. In a computer system including a processor, a bus coupled to the processor, and a memory coupled to the bus, and an electronic apparatus coupled to the bus, a method comprising the steps of:
    receiving a first set of signals and to provide the first set of signals to the processor; and
    receiving a set of event indicating signals from the processor in response to the first set of signals and in response to a set of instructions provided from the memory to the processor the set of event indicating signals recognized by an operating system as a hardware event, thereby compensating signals to the processor.

16. The method of claim 15, further comprising the steps of:
    receiving a signal from a device, the signal being among the first set of signals;
    indicating the occurrence of a hardware event; and
    accessing a device driver corresponding to the device.

17. The method of claim 15, further comprising the steps of:
    receiving a signal from a device, the signal being among the first set of signals;
    indicating the occurrence of a hardware event to the processor, wherein the set of instructions further comprises an Advanced Configuration Power Interface (ACPI) driver.

18. The method of claim 15, wherein:
    the response of the processor to the occurrence of hardware events is assigned lower priority compared to the response of the processor to the occurrence of corrected signals.

19. The method of claim 15, further comprising the step of:

directing the processor to execute a device driver corresponding to a pin of the event register receiving the first set of signals.

20. The method of claim 15, further comprising the step of:

coupling each of a plurality of bits of the register to a distinct signal of said plurality of signals indicating events.

21. The method of claim 20, further comprising the step of:

asserting a control bit within a Peripheral Component Interconnect (PCI) configuration register, the step of controlling further including a step of enabling write access to the PCI configuration register.

22. The computer system of claim 1, wherein the processor executes the set of instructions responsive to assertion of at least one defective signal of the plurality of signals indicating events.

23. The computer system of claim 1, wherein the processor executes the set of instructions responsive to assertion of an interrupt signal in response to occurrence of an event.

24. The computer system of claim 7, wherein the write operations to correct a value comprises writing a correct value to a bit in the General Purpose Event Status register.

25. The electronic apparatus of claim 8, wherein the processor executes the set of instructions responsive to assertion of at least one defective signal of the plurality of signals indicating events.

26. The electronic apparatus of claim 8, wherein the processor executes the set of instructions responsive to assertion of an interrupt signal in response to occurrence of an event.

27. The electronic apparatus of claim 8, wherein the write operations to correct a value comprises writing a correct value to a bit in the event register.

28. The method of claim 15, wherein the processor executes the set of instructions responsive to assertion of at least one defective signal of the first set of signals.

29. The method of claim 15, wherein the processor executes the set of instructions responsive to assertion of an interrupt signal in response to occurrence of an event.

30. In a computer system operating in an ACPI-compatible environment including a processor, a bus coupled to the processor, a memory coupled to the bus, and an electronic apparatus coupled to the bus, a method comprising the steps of:

receiving a first set of event indicating signals in a register, resulting in a change to the contents of the register;

providing the first set of event indicating signals to the processor;

in response to the first set of signals, the processor initiating a driver routine, the driver routine determining whether the first set of signals requires compensation; and upon determination that compensation is required, the driver routine providing a second set of event indicating signals to the register overwriting the prior contents of the register, the contents of the register recognized by an operating system as a hardware event, thereby compensating signals to the operating system.

31. The method of claim 30, wherein the first set of event indicating signals represents a request by a device to perform a wake-up operation from a power savings operating mode.

32. The method of claim 30, wherein the driver routine is a system management interrupt driver.

* * * * *

UNITED STATES PATENT AND TRADEMARK OFFICE
CERTIFICATE OF CORRECTION

PATENT NO. : 6,219,742 B1
DATED : April 17, 2001
INVENTOR(S) : Paul C. Stanley

It is certified that error appears in the above-identified patent and that said Letters Patent is hereby corrected as shown below:

Column 19,
Line 64, delete "processor" and insert therefor -- processor, --.

Column 20,
Line 43, delete "processor" and insert therefor -- processor, --.

Signed and Sealed this

Twenty-fifth Day of October, 2005

JON W. DUDAS
*Director of the United States Patent and Trademark Office*